United States Patent
Liem et al.

(10) Patent No.: US 7,924,692 B2
(45) Date of Patent: Apr. 12, 2011

(54) ACTUATOR ASSEMBLY PROVIDING TWO-DIMENSIONAL MOVEMENT OF A MOVEABLE ELEMENT IN A DATA STORAGE DEVICE

(75) Inventors: Andre Y. Liem, Wexford, PA (US); Mark David Bedillion, Allison Park, PA (US); Patrick Breckow Chu, Wexford, PA (US); Kevin Arthur Gomez, Wexford, PA (US); Mark Ian Lutwyche, Reisterstown, MD (US)

(73) Assignee: Seagate Technology LLC, Scotts Valley, CA (US)

( * ) Notice: Subject to any disclaimer, the term of this patent is extended or adjusted under 35 U.S.C. 154(b) by 1092 days.

(21) Appl. No.: 11/654,720

(22) Filed: Jan. 18, 2007

(65) Prior Publication Data

US 2008/0175136 A1    Jul. 24, 2008

(51) Int. Cl.
*G11B 9/00* (2006.01)
*H01H 47/00* (2006.01)

(52) U.S. Cl. ........................ 369/126; 361/143
(58) Field of Classification Search .................. 369/126; 361/143, 144, 146, 147
See application file for complete search history.

(56) References Cited

U.S. PATENT DOCUMENTS

| | | |
|---|---|---|
| 5,557,596 A | 9/1996 | Gibson et al. |
| 5,615,143 A | 3/1997 | MacDonald et al. |
| 5,679,952 A | 10/1997 | Lutwyche et al. |
| 5,801,472 A | 9/1998 | Wada et al. |
| 5,834,864 A | 11/1998 | Hesterman et al. |
| 6,310,342 B1 | 10/2001 | Braunstein et al. |
| 6,369,400 B1 | 4/2002 | Haeberle et al. |
| 6,507,553 B2 | 1/2003 | Kley |
| 6,587,408 B1 | 7/2003 | Jacobson et al. |
| 6,724,712 B2 | 4/2004 | Kley |
| 6,784,771 B1 | 8/2004 | Fan |
| 6,822,933 B2 | 11/2004 | Ives |
| 6,882,019 B2 | 4/2005 | Walmsley et al. |
| 6,925,047 B2 | 8/2005 | Ives |
| 2005/0190684 A1 | 9/2005 | Kley |
| 2005/0232061 A1* | 10/2005 | Rust et al. ............... 365/232 |
| 2006/0023606 A1 | 2/2006 | Lutwyche et al. |

OTHER PUBLICATIONS

M. I. Lutwyche et al., "Millipede—A Highly-Parallel Dense Scanning-Probe-Based Data-Storage System," Digest of Technical Papers—IEEE International Solid-State Circuits Conference, Feb. 7-9, 2000, pp. 126-127, 450.

* cited by examiner

*Primary Examiner* — Craig A. Renner
*Assistant Examiner* — Gustavo Polo
(74) *Attorney, Agent, or Firm* — Robert P. Lenart, Esq.; Pietragallo Gordon Alfano Bosick & Raspanti, LLP

(57) ABSTRACT

An apparatus comprises a movable member, first and second rigid members positioned on opposite sides of the movable member, a first suspension assembly connected between a base and the first and second rigid members, a second suspension assembly connected between the first and second rigid members and the movable member, first and second actuators coupled to the first and second rigid members along a first central axis, and third and fourth actuators coupled to the movable member along a second central axis.

20 Claims, 5 Drawing Sheets

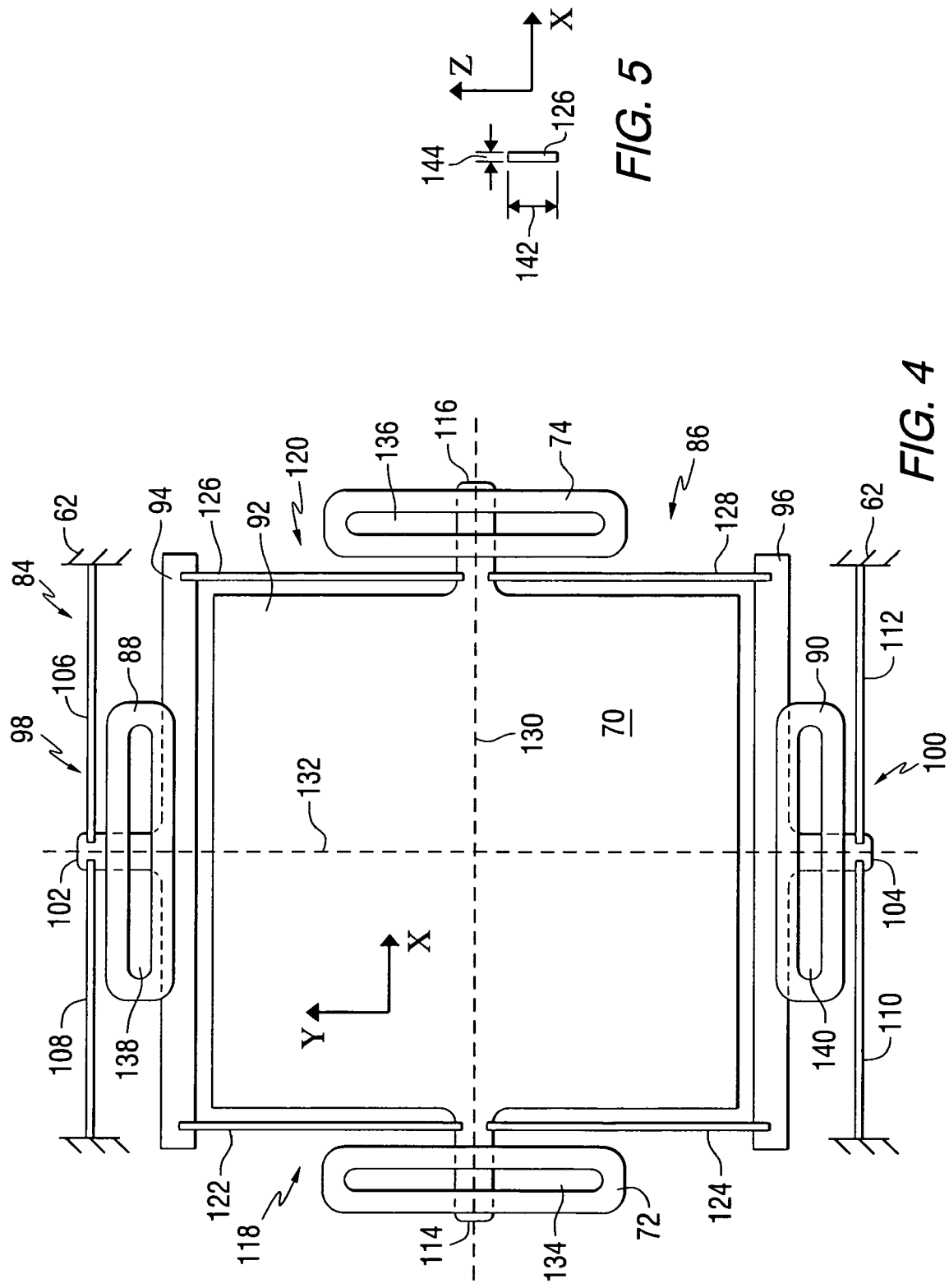

ACTUATOR ASSEMBLY PROVIDING TWO-DIMENSIONAL MOVEMENT OF A MOVEABLE ELEMENT IN A DATA STORAGE DEVICE

FIELD OF THE INVENTION

This invention relates to actuator assemblies and, more particularly, to actuator assemblies that may be used for data storage devices.

BACKGROUND OF THE INVENTION

Probe storage devices have been proposed to provide small size, high capacity, low cost data storage devices. Probe recording requires relative movement between a storage medium and an array of probes. Actuators are used to effect this movement. The storage medium can be a planar thin film structure. Previously proposed actuators result in coupling forces transmitted to the storage medium in a direction normal to the intended direction of motion. For example, a force applied to move the storage medium in the X-direction can also cause movement in the Y-direction, which creates undesired motion and affects the overall device accuracy. It would be desirable to minimize forces normal to the intended direction of motion.

There is a need for an actuator assembly that provides for movement of a storage media in a plane, while minimizing movement due to cross-coupling of the forces causing the movement.

SUMMARY OF THE INVENTION

The invention provides an apparatus comprising a movable member, first and second rigid members positioned on opposite sides of the movable member, a first suspension assembly connected between a base and the first and second rigid members, a second suspension assembly connected between the first and second rigid members and the movable member, first and second actuators coupled to the first and second rigid members along a first central axis, and third and fourth actuators coupled to the movable member along a second central axis.

BRIEF DESCRIPTION OF THE DRAWINGS

FIG. 4 is a top view of a positioning system of the probe storage device of FIG. 3.

FIG. 5 is a cross-sectional view of a spring.

DETAILED DESCRIPTION OF THE INVENTION

Figure 1:
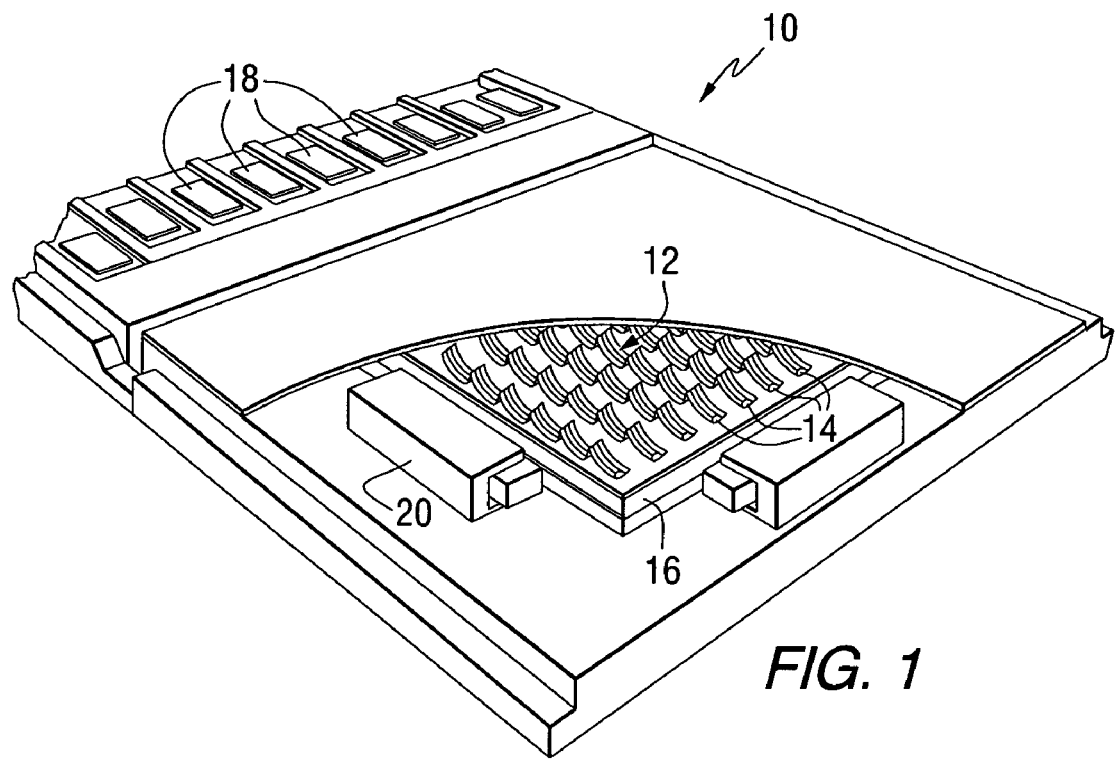
FIG. 1 is a perspective view of a ferroelectric probe storage device that can be modified to include an actuator constructed in accordance with an embodiment of the invention.

This invention provides an actuator for moving a movable member in two dimensions, which are perpendicular to each other. In another aspect, this invention provides probe storage devices that include an actuator for providing relative movement between a plurality of probes and an adjacent storage medium. FIG. 1 is a perspective view of a probe storage device 10 that can be modified to include an actuator assembly constructed in accordance with an embodiment of the invention. In the storage device 10 of FIG. 1, an array 12 of probes 14, also called tips or heads, are positioned adjacent to a storage medium 16. In the configuration shown in FIG. 1 the probes 14 and the medium 16 lie in planes that are generally parallel with each other. The probes 14 are electrically connected to connectors 18. The storage medium 16 is coupled to at least one actuator 20, which is configured to move the medium 16 relative to array 12. This movement causes individual storage locations or domains on medium 16 to be moved relative to the heads. Each head can include one or more electrodes. The storage medium in the example of FIG. 1 can be, for example a ferroelectric, magnetic or optical storage medium. However, the invention is not limited to any particular type of storage medium.

Figure 2:
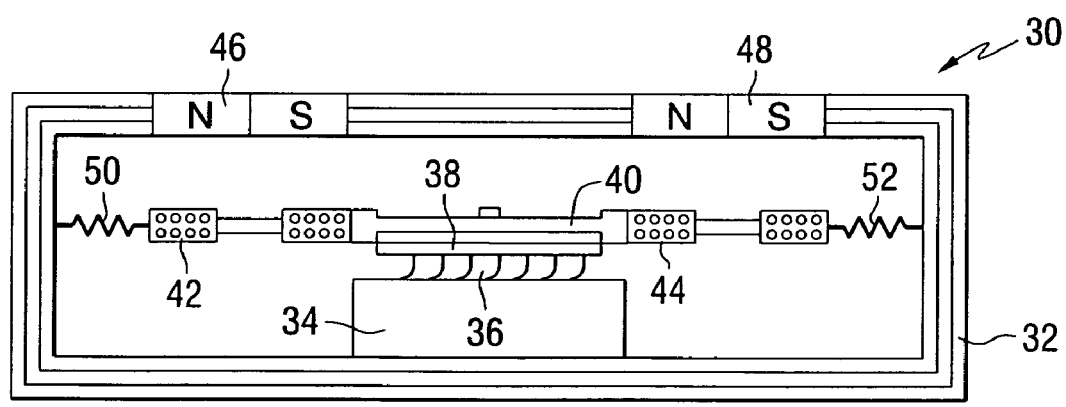
FIG. 2 is a schematic representation of a probe storage device.

Probe storage devices include actuators and suspension assemblies for providing relative movement between the storage medium and an array of probes. FIG. 2 is a cross-sectional view of a probe storage device 30. The device includes an enclosure 32, also referred to as a case, base, or frame, which contains a substrate 34. An array of probes 36 is positioned on the substrate. The probes extend upward to make contact with a storage medium 38. The storage medium 38 is mounted on a movable member, or sled 40. Coils 42 and 44 are mounted on the movable member. Magnets 46 and 48 are mounted in the enclosure near the coils. Springs 50 and 52 form part of a suspension assembly that supports the movable member. The enclosure 32 can be formed of, for example, injection molded plastic.

Figure 3:
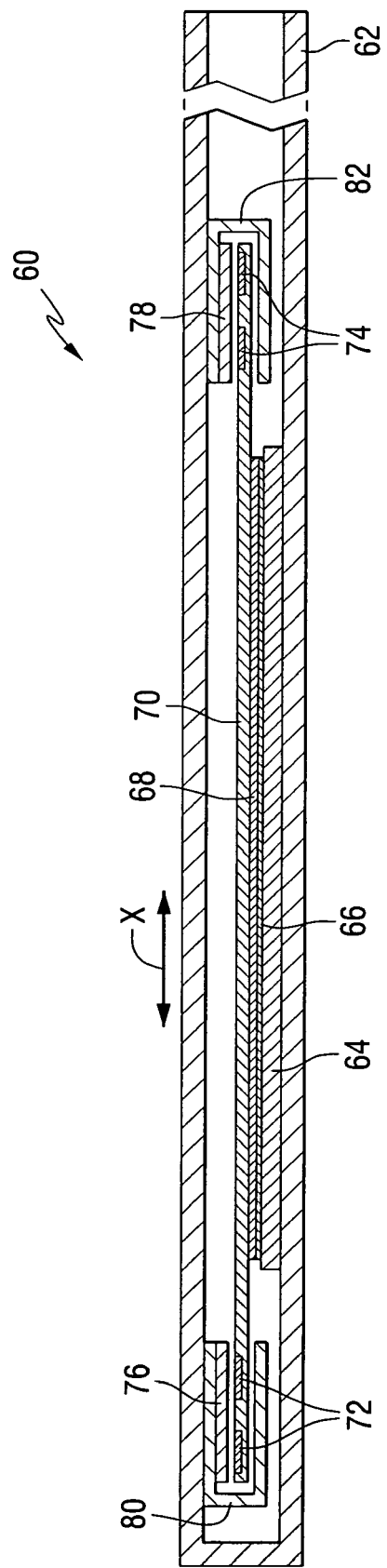
FIG. 3 is a cross-sectional view of a ferroelectric probe storage device constructed in accordance with an embodiment of the invention.

Devices constructed in accordance with this invention include actuators for moving the movable member in a plane. When used in a probe storage device, the invention can be used to move a storage medium or array of probes to provide relative movement between the storage medium and the array of probes. FIG. 3 is a cross-sectional view of a probe storage device 60 including actuator assembly constructed in accordance with an embodiment of the invention. The device includes an enclosure 62, also referred to as a case, base, or frame, which contains a substrate 64. An array of probes 66 is positioned on the substrate. The probes extend upward to make contact with a storage medium 68. The storage medium 68 is mounted on a movable member, or sled 70. Coils 72 and 74 are mounted on the movable member. Magnets 76 and 78 are mounted near the coils and magnetically coupled to magnetic keepers 80 and 82. The enclosure 62 can be formed of, for example, injection molded plastic. Alternatively, the coils can be mounted in the enclosure, with the magnets being mounted on the movable member. The combination of coils and magnets forms actuators that are used to move the movable member. Electric current in the coils creates a magnetic field that interacts with the magnetic field produced by the magnets to produce a force that has a component in the plane of the movable member and causes linear movement of the movable member.

FIG. 4 is a plan view of a movable member 70, suspension assemblies 84 and 86, and actuator coils 72, 74, 88 and 90. In the example of FIG. 4, the movable member 70, which may be used to position a storage medium or may itself be a storage medium, includes a planar portion 92. Suspension assembly 84 includes first and second rigid members or bars 94 and 96, and first and second spring assemblies 98 and 100, which provide elastic coupling between the enclosure 62, and the rigid members or bars. Protrusions 102 and 104 extend from a central portion of rigid members 94 and 96 respectively, in a direction parallel to the plane (or in the plane) of the movable member.

In FIG. 4 each of the suspension assemblies includes two spring assemblies, each having two springs. Suspension assembly 84 includes spring assemblies 98 and 100. Spring assembly 98 is shown to include a first spring 106 extending between the base or enclosure 62 and protrusion 102, and a second spring 108 extending between the base 62 and protrusion 102. Spring assembly 100 is shown to include a third spring 110 extending between the enclosure 62 and protrusion 104, and a fourth spring 112 extending between the enclosure 62 and protrusion 104.

Suspension assembly 84 includes spring assemblies 118 and 120. Spring assembly 118 is shown to include a first spring 122 extending between rigid member 94 and protrusion 114, and a second spring 124 extending between rigid member 96 and protrusion 114. Spring assembly 120 is shown to include a third spring 126 extending between rigid member 94 and protrusion 116, and a fourth spring 128 extending between rigid member 96 and protrusion 116.

In an alternative embodiment, each spring assembly can include a single spring that passes through, is embedded in, or is otherwise attached to one of the protrusions. For example, springs 106 and 108 could be replaced by a single spring that is connected at its ends to the base and is connected at its center to protrusion 102. Similarly, each pair of springs in each spring assembly could be replaced by a single spring.

The ends or attachment points of the springs can be encapsulated in (built into) plastic injection molded parts. They could alternatively be glued. The springs can be made of steel, although another metal, or silicon, would be a possible substitute. Silicon has the advantage that extremely high aspect ratios are achievable.

Protrusions 114 and 116 extend from central portions of opposite sides of the movable member. The actuator coils are centered relative to the springs. Each of the coils is positioned such that it is centered on a central axis 130 or 132 of the movable member, and is coincident with the mass moment of inertia of the inner structure. Forces produced by the actuators cause movement of the movable member along the central axes.

The springs can act as heat dissipation elements in combination with the keeper material. The springs can also be electrically connected to the coils to serve as conductors that deliver current to the coils. The coils can each include multiple turns of wire around spacers 134, 136, 138 and 140, formed of, for example, a carbon resin or glass filled plastic. Current in the coil wires (supplied by a separate controller) produces a magnetic field that interacts with magnetic fields produced by the magnets to create forces that are used to move the storage medium in the directions indicated as X and Y.

All springs should be stiff in the Z-direction (perpendicular to the X-Y plane) and less stiff in the X or Y-direction. FIG. 5 is a cross-sectional view of one of the springs 126. In this example, the springs have a rectangular cross-sectional shape, with a relatively high aspect ratio (for example greater than 5) such that width 144 of the springs in the X or Y-direction is substantially less than the thickness 142 of the springs in a direction perpendicular to the X-Y plane (the Z-direction). The springs simultaneously provide the required vertical stiffness (in the Z-direction) and horizontal flexibility (in the X or Y-direction).

The positioning systems of this invention include a set of springs and associated components that, when subjected to an actuation force, exhibit minimal cross-coupling between forces applied in perpendicular directions in an X-Y scanner. FIG. 4 shows an embodiment using linear springs including a first set of springs limiting motion in the X-direction and a second set of springs limiting motion in the Y-direction.

Figure 6:
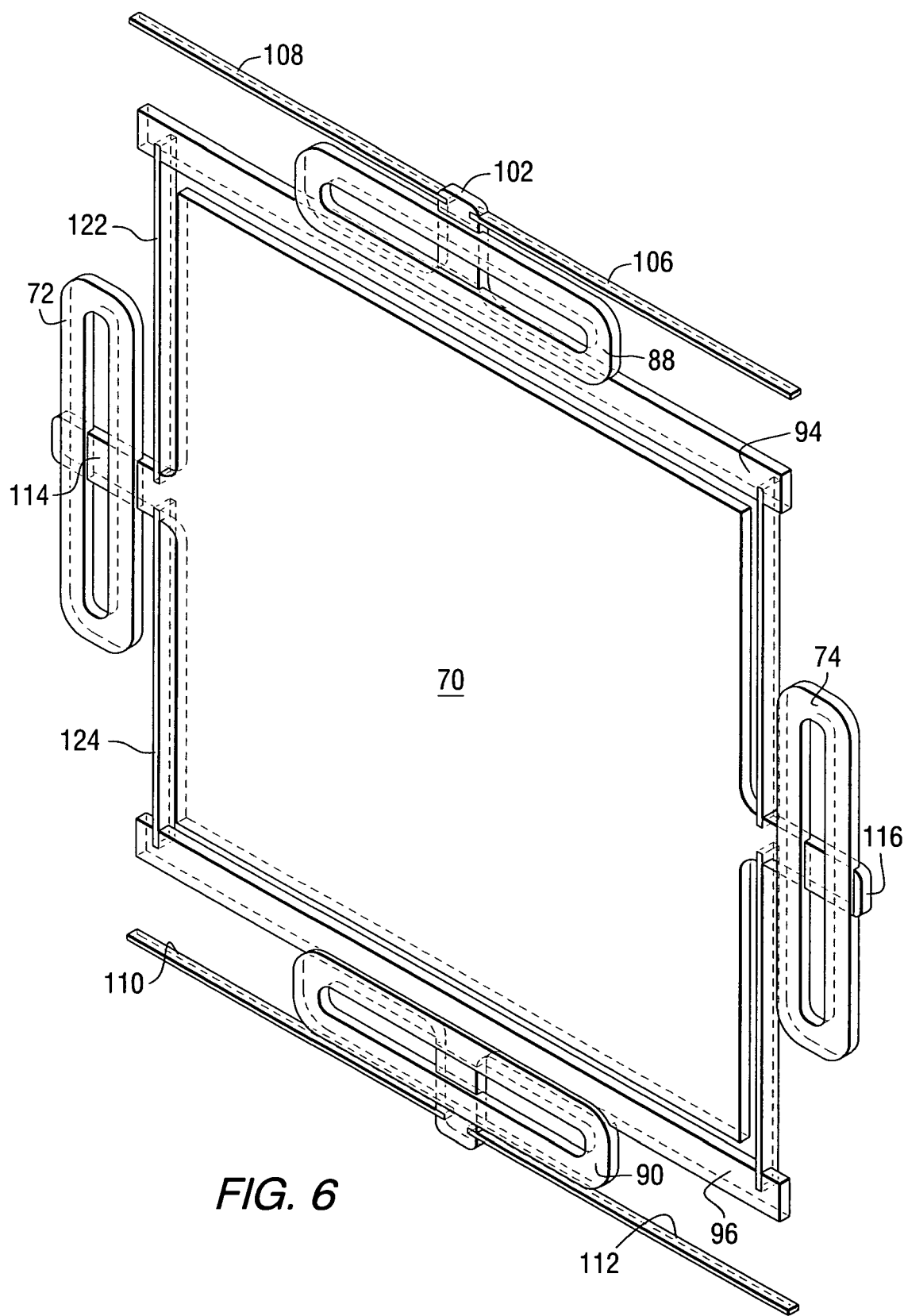
FIG. 6 is an isometric view of the positioning system of the probe storage device of FIG. 3.

FIG. 6 is an isometric view of the probe storage device positioning system of FIG. 4. The rigid members 94 and 96 are shown to extend beyond the edges of the movable member. The springs have rectangular cross-sections and the ends of the springs are embedded in the rigid members or protrusions.

Figure 7:
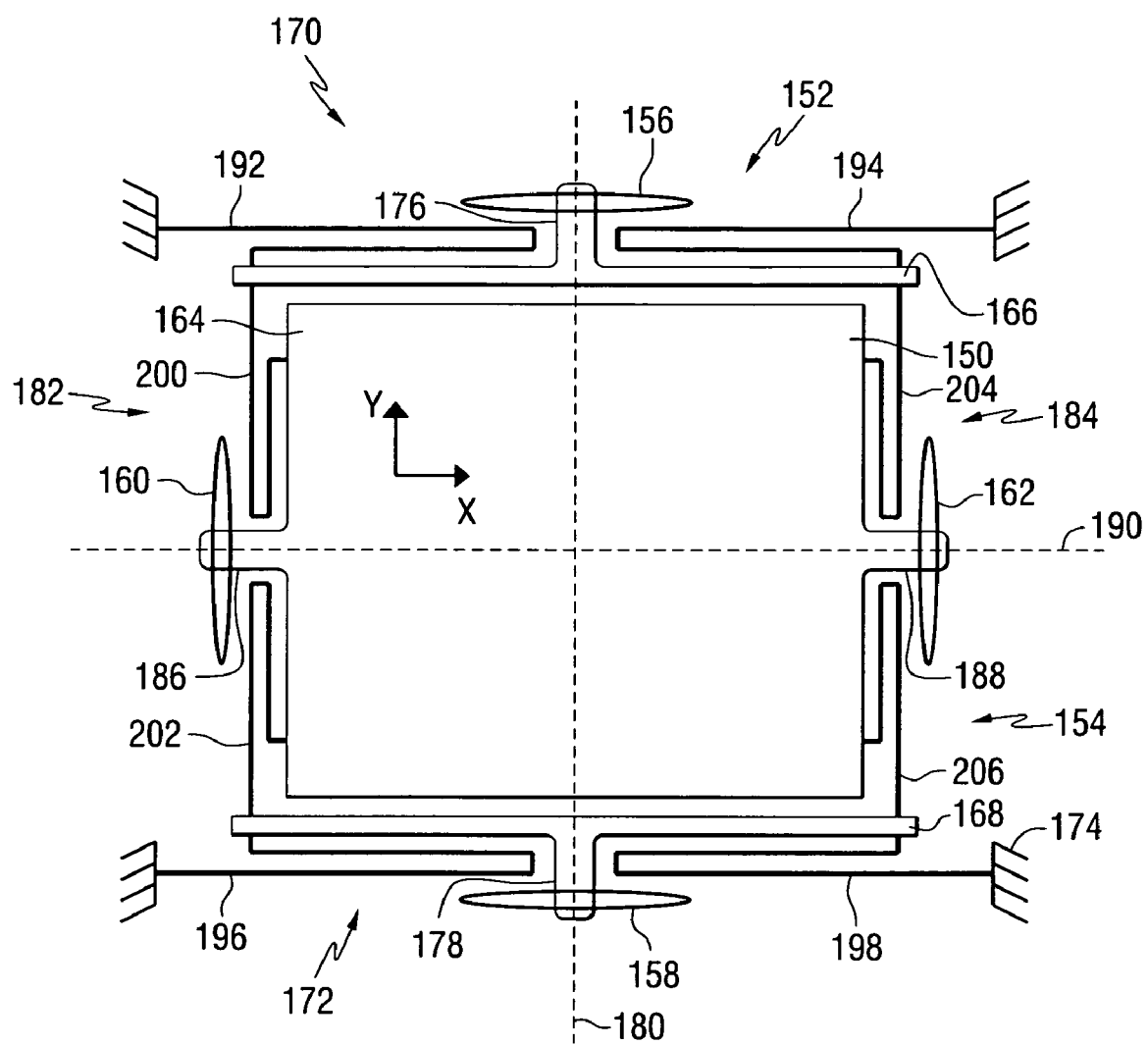
FIG. 7 is a plan view of another embodiment of the invention.

FIG. 7 is a plan view of another embodiment of the invention, including a movable member 150, suspension assemblies 152 and 154, and actuator coils 156, 158, 160 and 162. In the example of FIG. 7, the movable member 150, which may be used to position a storage medium or may itself be a storage medium, includes a planar portion 164 lying in a plane. Suspension assembly 152 includes first and second rigid members 166 and 168, and first and second spring assemblies 170 and 172, which provide elastic coupling between the enclosure, frame or base 174, and the rigid members. Protrusions 176 and 178 extend from a central portion of rigid members 166 and 168 respectively, in a direction parallel to the plane (or in the plane) of the movable member. Protrusions 176 and 178 are positioned along a first central axis 180 of the movable member. Actuator coils 156 and 158 are connected or otherwise coupled to one of the projections and centered on axis 180.

Suspension assembly 154 includes first and second spring assemblies 182 and 184, which provide elastic coupling between the movable member 150 and the rigid members 166 and 168. Protrusions 186 and 188 extend from a central portion of the movable member 150, in a direction parallel to the plane (or in the plane) of the movable member. Protrusions 186 and 188 are positioned along a second central axis 190 of the movable member. Actuator coils 160 and 162 are connected or otherwise coupled to one of the projections and centered on axis 190.

Each spring assembly includes two springs. Spring assembly 170 is shown to include a first folded spring 192 extending between the enclosure 174 and the rigid member 166, and a second folded spring 194 extending between the enclosure 174 and the rigid member 166. Spring assembly 172 is shown to include a first folded spring 196 extending between the enclosure 174 and the rigid member 168, and a second folded spring 198 extending between the enclosure 174 and the rigid member 168.

Spring assembly 182 is shown to include a first folded spring 200 extending between the movable member 150 and the rigid member 166, and a second folded spring 202 extending between the movable member 150 and the rigid member 168. Spring assembly 184 is shown to include a first folded spring 204 extending between the movable member 150 and the rigid member 166, and a second folded spring 206 extending between the movable member 150 and the rigid member 168. The springs are attached symmetrically to the movable member and the rigid members to avoid rotation of the movable member.

The ends or attachment points of the springs can be encapsulated in (built into) plastic injection molded parts. They could alternatively be glued. The springs can be made of steel, although another metal, or silicon, would be a possible substitute. Silicon has the advantage that extremely high aspect ratios are achievable.

The coils are centered relative to the springs in each spring assembly. Each of the coils is positioned such that it is centered on a central axis 180 or 190 of the movable member, and is coincident with the mass moment of inertia of the inner structure. The use of folded springs provides superior stiffness linearity over the stroke of the actuators. More than one bend is possible to reduce stiffness, depending upon available space. The portions of the springs that are shown to lie between the coils and the movable member may be moved to lie beside the coils to save space.

In an alternative embodiment, single springs can be used in place of two springs in FIG. 7. For example, springs 196 and 202 can be replaced by a single spring that passes through, is embedded in, or is otherwise connected to rigid member 168. Similarly, spring pairs 192 and 200, 194 and 204, and 198 and 206, can each be replaced by single springs.

The springs should have a cross-sectional shape having a high aspect ratio, providing relatively low resistance to X-Y planar motion and relatively high resistance to Z-direction (out-of-plane) motion. The springs can have a rectangular cross-sectional shape, but the invention is not limited to springs having a particular shape. The protrusions are provided as attachment points for the actuator coils. The protrusions also keep the springs out of the way of the actuator coils. This allows the line of action of the actuators to be at the same Z-direction position as the spring attachment point. The application of force due to the springs and the actuators is in the same plane.

By coupling the actuators to the movable member or rigid members along mutually perpendicular central axes, the spring forces ideally provide forces only, not torques, to the structure. This makes the assembly less susceptible to manufacturing variations in spring parameters than other designs. The spring stiffnesses can be tuned to make the fundamental natural frequencies of the structure in the X and Y directions equal. This allows better rejection of the residual cross-coupling using a servo system to drive the actuators. This benefit applies in the closed-loop case, wherein the device is under servo control, with a sensitivity bandwidth above the natural frequency of the device. The servo system would be able to strongly reject cross-coupling at the natural frequency.

The invention is also applicable to devices in which accuracy in one direction (the inner stage) is much more important than accuracy in the other direction (the outer stage). One example is using a spherical lens to position a beam in one axis and focus a spot in the other axis. The spherical lens could be mounted on the movable member. Typically spot position will be more sensitive than focus, and hence the inner stage will be used for positioning the spot and the outer stage for focusing. Other examples include manufacturing applications in which tolerances for X are more strict than Y, or when grooves have been made to guide the mover in one direction while absolute accuracy is required in the other.

In the described embodiments, the force in the X-direction, $F_x$, is the tracking force; and the force in the Y-direction, $F_y$, is the scanning force. Fast tracking is desirable and tests show that $F_x$ performance is better than $F_y$. More specifically, $F_x$ has a higher bandwidth, such that more accurate control is possible. This is because high frequency modes limit the performance of feedback control systems. Higher bandwidth provides faster response time.

Finite element analysis conducted on one example of the present invention demonstrates that the inner axis experiences only 3% of the motion of the outer axis due to cross-coupling, i.e., if the outer stage moves 100 μm, the inner stage moves only 3 μm. In addition, the mechanical decoupling characteristics of structures constructed in accordance with this invention drastically reduce the dominant frequencies from 300-20 kHz. This is extremely desirable from a controller design standpoint. Accuracy and response time typically improve with increasing bandwidth.

While the above description relates to probe storage devices, this invention can also be applied to other devices that require movement in an X-Y plane, such as for example, atomic force microscope stages, magnetic recording drag testers, and other general X-Y planar scanners. In these applications, the movable member and suspensions might not be housed in an enclosure, but may be mounted in a case, base, frame, or other mounting structure.

Whereas particular embodiments have been described herein for the purpose of illustrating the invention and not for the purpose of limiting the same, it will be appreciated by those of ordinary skill in the art that numerous variations of the details, materials, and arrangement of parts may be made within the principle and scope of the invention without departing from the invention as described in the appended claims.

What is claimed is:

1. An apparatus comprising:
   a movable member;
   first and second rigid members positioned on opposite sides of the movable member;
   a first suspension assembly connected between a base and the first and second rigid members;
   a second suspension assembly connected between the first and second rigid members and the movable member;
   first and second actuators coupled to the first and second rigid members along a first central axis; and
   third and fourth actuators connected to first and second protrusions on the movable member along a second central axis.

2. The apparatus of claim 1, wherein the fundamental natural frequencies of the apparatus along the first and second central axes are equal.

3. The apparatus of claim 1, wherein the first and second central axes are perpendicular to each other.

4. The apparatus of claim 1, wherein the first and second actuators are connected to first and second protrusions on the first and second rigid members.

5. The apparatus of claim 1, wherein each of the actuators comprises:
   a coil and a magnet.

6. The apparatus of claim 1, wherein the movable member includes a data storage medium.

7. The apparatus of claim 1, wherein the first suspension assembly includes first and second spring assemblies.

8. The apparatus of claim 7,
   wherein each of the first and second spring assemblies includes a first spring having first and second ends connected to the base and a center connected to one of the rigid members.

9. The apparatus of claim 7, wherein the first and second spring assemblies are connected to first and second protrusions on the first and second rigid members.

10. The apparatus of claim 9, wherein each of the first and second spring assemblies includes a first spring connected between the base and one of the protrusions on the first or second rigid member, and a second spring connected between the base and one of the protrusions on the first or second rigid member.

11. The apparatus of claim 7, wherein each of the first and second spring assemblies includes a first spring connected between the base and one of the rigid members, and a second spring connected between the base and one of the rigid members.

12. The apparatus of claim 11, wherein each of the first and second springs is a folded spring.

13. The apparatus of claim 7, wherein the second suspension assembly includes third and fourth spring assemblies.

14. The apparatus of claim 13, wherein each of the third and fourth spring assemblies includes a first spring connected between the movable member and one of the rigid members, and a second spring connected between the movable member and one of the rigid members.

15. The apparatus of claim 13, wherein the third and fourth spring assemblies are connected to first and second protrusions on the movable member.

16. The apparatus of claim 15, wherein each of the third and fourth spring assemblies includes a first spring connected between one of the rigid members and one of the protrusions on the first or second rigid member, and a second spring connected between one of the rigid members and one of the protrusions on the first or second rigid member.

17. The apparatus of claim 15, wherein each of the third and fourth spring assemblies includes a first spring having first and second ends connected to the rigid members and a center connected to one of the protrusions on the first or second rigid member.

18. An apparatus comprising:
a movable member;
first and second rigid members positioned on opposite sides of the movable member;
a first suspension assembly connected between a base and the first and second rigid members;
a second suspension assembly connected between the first and second rigid members and the movable member;
first and second actuators coupled to the first and second rigid members along a first central axis; and
third and fourth actuators coupled to the movable member along a second central axis, wherein each of the first and second suspension assemblies includes a plurality of springs each having a first thickness in the first direction and a second thickness in a direction substantially perpendicular to the first direction, wherein the second thickness is larger than the first thickness.

19. The apparatus of claim 18, wherein the first and second central axes are perpendicular to each other.

20. An apparatus comprising:
a movable member;
first and second rigid members positioned on opposite sides of the movable member;
a first suspension assembly connected between a base and the first and second rigid members;
a second suspension assembly connected between the first and second rigid members and the movable member;
first and second actuators coupled to the first and second rigid members along a first central axis; and
third and fourth actuators coupled to the movable member along a second central axis;
wherein the first suspension assembly includes first and second spring assemblies, the second suspension assembly includes third and fourth spring assemblies, each of the third and fourth spring assemblies includes a first spring connected between the movable member and one of the rigid members, and a second spring connected between the movable member and one of the rigid members, and
wherein each of the first and second springs is a folded spring.

* * * * *